US011018708B2

(12) United States Patent
Fechtel

(10) Patent No.: US 11,018,708 B2
(45) Date of Patent: May 25, 2021

(54) RECEIVED SIGNAL FILTERING DEVICE AND METHOD THEREFOR

(71) Applicant: Intel IP Corporation, Santa Clara, CA (US)

(72) Inventor: Stefan Fechtel, Zorneding (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 16/610,113

(22) PCT Filed: May 2, 2018

(86) PCT No.: PCT/US2018/030562
§ 371 (c)(1),
(2) Date: Nov. 1, 2019

(87) PCT Pub. No.: WO2018/222328
PCT Pub. Date: Dec. 6, 2018

(65) Prior Publication Data

US 2020/0083919 A1 Mar. 12, 2020

(30) Foreign Application Priority Data

Jun. 2, 2017 (EP) .................................... 17174179

(51) Int. Cl.
*H04B 1/10* (2006.01)
*H04B 1/12* (2006.01)

(52) U.S. Cl.
CPC ... *H04B 1/1036* (2013.01); *H04B 2001/1063* (2013.01)

(58) Field of Classification Search
CPC .......... H04B 1/10; H04B 1/1036; H04B 1/12; H04B 1/1027
See application file for complete search history.

(56) References Cited

U.S. PATENT DOCUMENTS 5,444,864 A * 8/1995 Smith .................... H04B 1/408 455/24
5,499,399 A 3/1996 Bond et al.
(Continued)

FOREIGN PATENT DOCUMENTS

CN 1842110 A 10/2006
CN 101047439 A 10/2007
(Continued)

OTHER PUBLICATIONS

Liu et al., "Kernel Adaptive Filtering: A Comprehensive Introduction", 2010, 236 pages, John Wiley & Sons, Hoboken, New Jersey.
(Continued)

*Primary Examiner* — Blane J Jackson
(74) *Attorney, Agent, or Firm* — Viering, Jentschura & Partner mbB

(57) ABSTRACT

A communication device is provided that includes a receiver configured to receive a signal. The communication device further includes a circuit configured to determine an interference reference signal based on an interference signal, to multiply the received signal with the interference reference signal in the time domain to form a multiplication signal and to filter the multiplication signal to form a filtered signal.

20 Claims, 13 Drawing Sheets

Receiving a signal. — 1302

Determining an interference reference signal based on an interference signal. — 1304

Multiplying the received signal with the interference reference signal in the time domain to form a multiplication signal. — 1306

Filtering the multiplication signal to form a filtered signal. — 1308

(56) References Cited

U.S. PATENT DOCUMENTS

| | | | |
|---|---|---|---|
| 5,517,531 | A | 5/1996 | Bond et al. |
| 5,555,310 | A | 9/1996 | Minami et al. |
| 6,141,390 | A | 10/2000 | Cova |
| 6,512,797 | B1 | 1/2003 | Tellado et al. |
| 6,678,318 | B1 | 1/2004 | Lai |
| 6,687,235 | B1 | 2/2004 | Chu |
| 6,745,018 | B1 | 6/2004 | Zahavi et al. |
| 7,224,748 | B2 | 5/2007 | Rudolph |
| 7,283,543 | B1 | 10/2007 | Thompson |
| 7,385,705 | B1 | 6/2008 | Hoctor et al. |
| 8,320,868 | B2 | 11/2012 | Pratt et al. |
| 8,416,759 | B1 | 4/2013 | Narasimhan et al. |
| 9,276,602 | B1 | 3/2016 | Pagnanelli |
| 10,284,356 | B2 * | 5/2019 | Bharadia ................ H04B 1/525 |
| 2003/0012160 | A1 | 1/2003 | Webster et al. |
| 2003/0101206 | A1 | 5/2003 | Graziano et al. |
| 2004/0044715 | A1 | 3/2004 | Aldroubi et al. |
| 2004/0155707 | A1 | 8/2004 | Kim et al. |
| 2005/0058302 | A1 | 3/2005 | Dance et al. |
| 2005/0131973 | A1 | 6/2005 | Chambers et al. |
| 2005/0163250 | A1 | 7/2005 | McCallister |
| 2005/0163252 | A1 | 7/2005 | McCallister et al. |
| 2005/0286668 | A1 | 12/2005 | Kubin et al. |
| 2006/0015640 | A1 | 1/2006 | Denk et al. |
| 2007/0071120 | A1 | 3/2007 | Talwar |
| 2007/0230547 | A1 | 10/2007 | Asai et al. |
| 2008/0082597 | A1 | 4/2008 | Batruni |
| 2008/0159551 | A1 | 7/2008 | Harley et al. |
| 2008/0249765 | A1 | 10/2008 | Schuijers |
| 2009/0116664 | A1 | 5/2009 | Smirnov et al. |
| 2009/0168910 | A1 | 7/2009 | Futatsugi et al. |
| 2009/0185613 | A1 | 7/2009 | Agazzi et al. |
| 2009/0257477 | A1 | 10/2009 | Khayrallah et al. |
| 2010/0135449 | A1 | 6/2010 | Row et al. |
| 2010/0217790 | A1 | 8/2010 | Yang et al. |
| 2011/0103431 | A1 | 5/2011 | Narasimha et al. |
| 2011/0182330 | A1 | 7/2011 | Olson et al. |
| 2011/0182344 | A1 | 7/2011 | Rosenhouse et al. |
| 2011/0268226 | A1 | 11/2011 | Lozhkin |
| 2011/0270590 | A1 | 11/2011 | Aparin et al. |
| 2012/0140618 | A1 | 6/2012 | Wigren |
| 2012/0140860 | A1 | 6/2012 | Rimini et al. |
| 2012/0295558 | A1 | 11/2012 | Wang et al. |
| 2013/0044791 | A1 | 2/2013 | Rimini et al. |
| 2013/0166259 | A1 | 6/2013 | Weber et al. |
| 2014/0169431 | A1 | 6/2014 | Arambepola et al. |
| 2014/0269857 | A1 | 9/2014 | Rimini et al. |
| 2014/0301498 | A1 | 10/2014 | Rimini et al. |
| 2015/0010118 | A1 | 1/2015 | Beidas et al. |
| 2015/0032788 | A1 | 1/2015 | Velazquez et al. |
| 2015/0077180 | A1 | 3/2015 | Matsubara et al. |
| 2015/0078226 | A1 | 3/2015 | Charlon et al. |
| 2015/0098521 | A1 | 4/2015 | Beidas et al. |
| 2015/0131757 | A1 | 5/2015 | Carbone et al. |
| 2015/0156003 | A1 | 6/2015 | Khandani |
| 2015/0156004 | A1 | 6/2015 | Khandani |
| 2015/0236750 | A1 | 8/2015 | Choi et al. |
| 2015/0311929 | A1 | 10/2015 | Carbone et al. |
| 2015/0341125 | A1 * | 11/2015 | Bharadia .................. H04B 1/00 370/277 |
| 2016/0072531 | A1 | 3/2016 | Abrishamkar et al. |
| 2016/0072649 | A1 | 3/2016 | Tu et al. |
| 2016/0173165 | A1 | 6/2016 | Choi et al. |
| 2016/0182104 | A1 * | 6/2016 | Xue ....................... H04B 1/525 455/78 |
| 2016/0261297 | A1 | 9/2016 | Heinikoski et al. |
| 2016/0294425 | A1 * | 10/2016 | Hwang ................ H04B 1/1027 |

FOREIGN PATENT DOCUMENTS

| | | | |
|---|---|---|---|
| CN | 101471912 | A | 7/2009 |
| CN | 102200759 | A | 9/2011 |
| CN | 103947106 | A | 7/2014 |
| CN | 103986482 | A | 8/2014 |
| CN | 104185186 | B | 2/2018 |
| CN | 103873399 | B | 3/2018 |
| EP | 2174235 | B1 | 3/2016 |
| WO | 2007050593 | A2 | 5/2007 |
| WO | 2013101235 | A1 | 7/2013 |
| WO | 2013179399 | A1 | 12/2013 |
| WO | 2014051857 | A1 | 4/2014 |

OTHER PUBLICATIONS

Esmaeeli, Siamak et al., "Reduced Memory Requirement in Hardware Implemention of SVM Classifiers", 20th Iranian Conference on Electrical Engineering, (ICEE2012), May 15-17, 2012, pp. 46-50, Tehran, Iran.

Gustafsson, Oscar et al., "Multiplierless Piecewise Linear Approximation of Elementary Functions", Fortieth Asilomar Conference on Signals, Systems and Computers, Oct. 2006, pp. 1678-1681, Pacific Grove, California.

Bousquet et al, "Kernel methods and their applications to signal processing", Proceedings of International Conference on Acoustics, Speech and Signal Processing (ICASSP '03), Apr. 6-10, 2003, pp. IV 860-IV 863, IEEE, Hong Kong, China.

Kuech et al., "Nonlinear Acoustic Echo Cancellation Using Adaptive Orthogonalized Power Filters", International Conference on Acoustics, Speech and Signal Processing, Mar. 2005, 4 pages, IEEE, Philadelphia, PA.

Abbas, "A Novel Fast Orthogonal Search Method for Design of Functional Link Networks and their Use in System Identification", IEEE International Conference on Acoustics Speech and Signal Processing (ICASSP '05), Oct. 2007, pp. 2743-2274, IEEE, Montreal, Canada.

Syrjaelae et al., "Self-interference cancellation in full-duplex radio transceivers with oscillator phase noise", 20th European Wireless Conference, May 2014, 6 pages, Barcelona, Spain.

Raich et al., "Digital baseband predistortion of nonlinear power amplifiers using orthogonal polynomials", Proceedings of International Conference on Acoustics, Speech and Signal Processing (ICASSP '03), Apr. 2003, pp. VI-689-VI-692, IEEE; Hongkong, China.

Heino et al., "Recent advances in antenna design and interference cancellation algorithms for in-band full duplex relays", IEEE Communications Magazine, May 2015, pp. 91-101.

Choi et al., "Full Duplex Mimo: Algorithms and POC Performance", Nov. 15, 2017, 49 pages, Intel Labs/Wireless Communication Research.

Kuech, "Approaches to Non-Linear Acoustic Echo Cancellation", ITG-Fachtagung Sprachkommunikation, Oct. 8-10, 2008, 4 pages, VDE Verlag GmbH, Aachen, Germany.

Vasilis Z Marmarelis, "Construction of the Wiener Series", Appendix III, 2004, 2 pages, publisher Wiley-IEEE Press.

Borys, "On Modelling of Nonlinear Systems and Phenomena with the Use of Volterra and Wiener Series", TransNav, Mar. 2015, pp. 91-98, vol. 9, No. 1.

European Search Report based on Application No. 20170174179, dated Nov. 23, 2017, 2 pages (for reference purpose only).

* cited by examiner

RECEIVED SIGNAL FILTERING DEVICE AND METHOD THEREFOR

CROSS-REFERENCE TO RELATED APPLICATIONS

This application is a national stage entry according to 35 U.S.C. 371 of PCT Application No. PCT/US2018/030562, which was filed on May 2, 2018, and which claims priority to European Patent Application No. 17 174 179.6, which was filed on Jun. 2, 2017, each of which are entirely incorporated herein by reference.

TECHNICAL FIELD

The present disclosure relates to communication devices and methods for radio communication.

BACKGROUND

In a scenario, a communication device receives a signal. The communication device may include a circuit to filter the received signal. It may be desirable to provide a communication device to reliably filter the received signal based on a reduced accuracy requirement for the filter process of the circuit.

SUMMARY

A communication device comprises a receiver configured to receive a signal. The communication device further includes a circuit configured to determine an interference reference signal based on an interference signal, to multiply the received signal with the interference reference signal in the time domain to form a multiplication signal and to filter the multiplication signal to form a filtered signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

A "circuit" may be understood as any kind of a logic implementing entity, which may be special purpose circuitry or a processor executing software stored in a memory, firmware, or any combination thereof. Further, a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

Various aspects of this disclosure provide a communication device that may include a receiver configured to receive a signal and a circuit configured to determine an interference reference signal based on an interference signal, to multiply the received signal with the interference reference signal in the time domain to form a multiplication signal and to filter the multiplication signal to form a filtered signal. Thus, the communication device may be configured to reliably filter the received signal. Further, the communication device may be configured to efficiently filter the received signal based on an uncomplex filtering process.

This disclosure further provides a device that may include a receiver configured to receiving a signal. The device may be configured to multiply the received signal with a predetermined interference reference signal in the time domain to form a multiplication signal and to filter the multiplication signal to form a filtered signal. Thus, the device may be configured to reliably filter the received signal. Further, the device may be configured to flexibly filter received signals based on an uncomplex filtering process.

Furthermore, a method for radio communication may be provided that may include receiving a signal, determining an interference reference signal based on an interference signal, multiplying the received signal with the interference reference signal in the time domain to form a multiplication signal and filtering the multiplication signal to form a filtered signal. Thus, an uncomplex method may be provided that reliably filters the received signal. Further, the method may efficiently filter the received signal based on an uncomplex filtering process.

Figure 1:
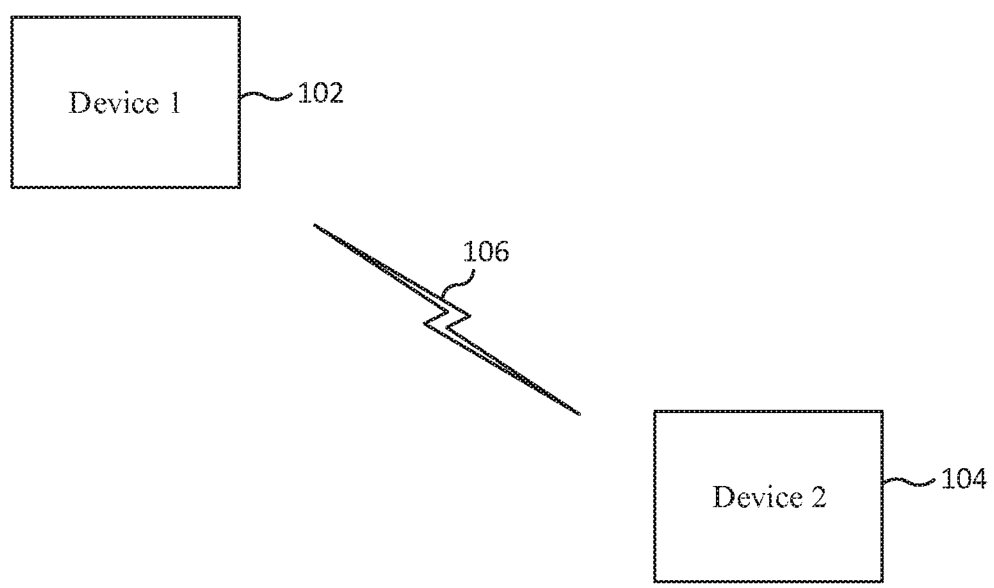
FIG. 1 shows a schematic diagram of an exemplary scenario in which a first communication device is configured to transmit signals and receive signals from a second communication device.

FIG. 1 shows a schematic diagram of an exemplary scenario in which a first communication device 102 may be configured to transmit signals and receive signals from a second communication device 104. The first communication device 102 may be operatively connected with the second communication device 104 via a radio frequency connection 106. The first communication device 102 may be referenced as device 1. The second communication device 104 may be referenced as device 2.

Figure 2:
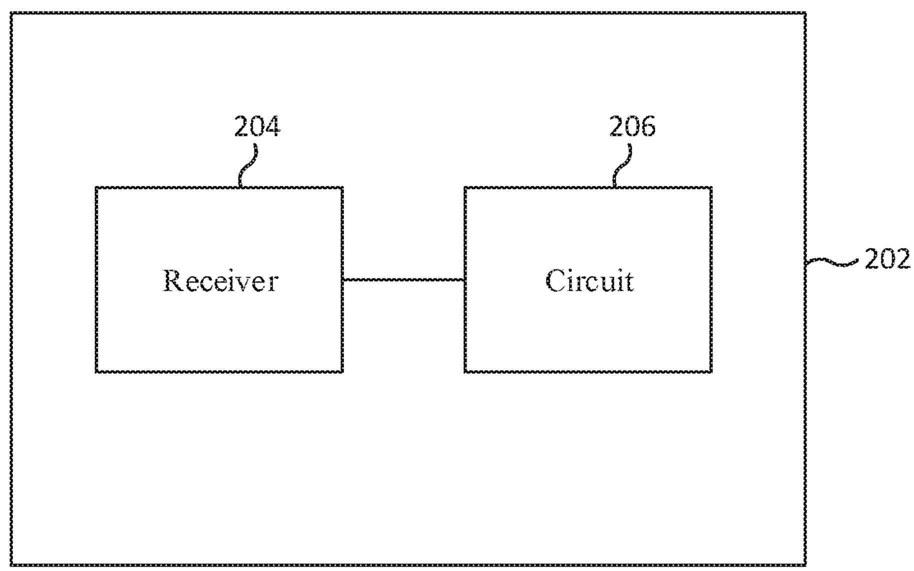
FIG. 2 shows a schematic diagram of an exemplary communication device.

FIG. 2 shows a schematic diagram of an exemplary communication device 202. The communication device 202 may include a receiver 204 and a circuit 206. The receiver 204 may be configured to receive a signal. The circuit 206 may be configured to determine an interference reference signal based on an interference signal. Further, the circuit 206 may be configured to multiply the received signal using the interference reference signal in the time domain to form a multiplication signal. Moreover, the circuit 206 may be configured to filter the multiplication signal to form a filtered signal. Thus, the circuit 206 may be configured to efficiently and effectively filter a received signal in a simple manner.

In an example, the communication device 202 may be the first communication device 102.

In an example, the circuit 206 may be configured to determine a plurality of interference reference signals. Further, the circuit 206 may be configured to multiply the received signal with each interference reference signal of the plurality of interference reference signals in the time domain to form the multiplication signal.

Figure 3:
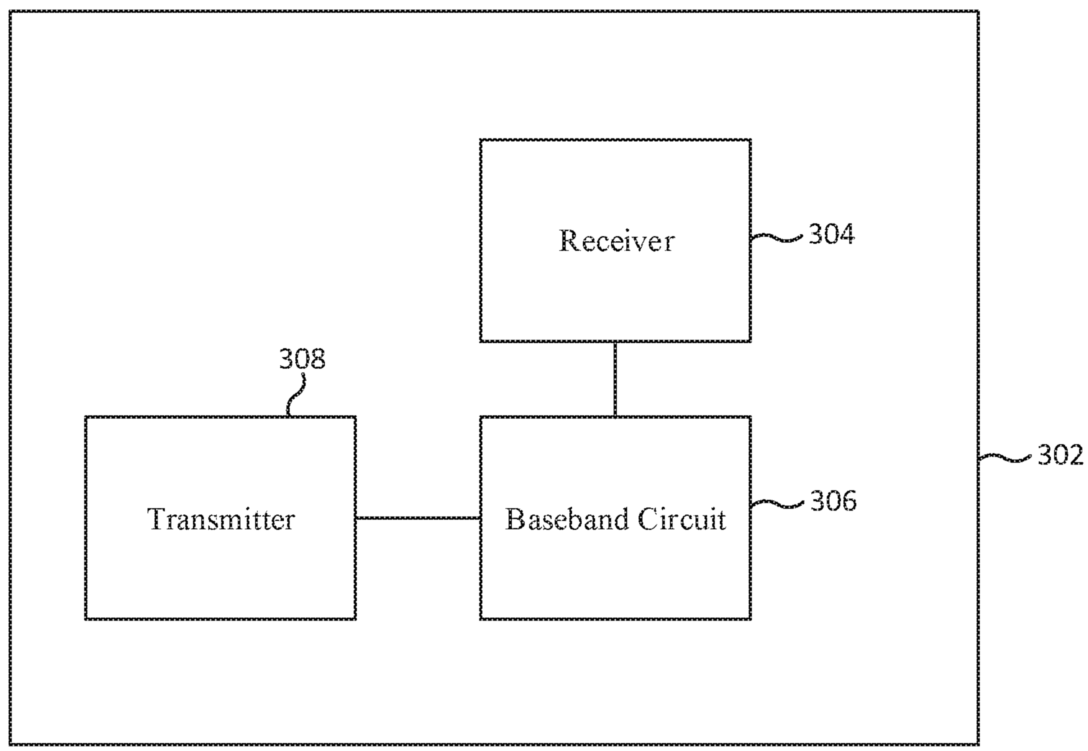
FIG. 3 shows a schematic diagram of an exemplary communication device that may include a receiver, a baseband circuit and a transmitter.

FIG. 3 shows a schematic diagram of an exemplary communication device 302 that may include a receiver 304, a baseband circuit 306 and a transmitter 308. The baseband circuit 306 may be operatively connected with the receiver 304 and the transmitter 308.

The receiver 304 may be configured to receive a first signal r(t) and to provide the first signal r(t) to the baseband circuit 306. Further, the transmitter 308 may be configured to transmit a second signal and to supply the second signal to the baseband circuit 306. The first signal r(t) may include an interference signal that is received based on the transmitted second signal. The baseband circuit 306 may be configured to determine an estimated interference signal q(t) based on the second signal. The estimated interference signal q(t) may be a function of a time t.

The baseband circuit 306 may be configured to determine an amplitude $a_q(t)$ of the estimated interference signal q(t) and a phase $\phi_q(t)$ of the estimated interference signal q(t). The estimated interference signal q(t) may be related with the amplitude $a_q(t)$ and the phase $\phi_q(t)$ by a formula (1):

$$q(t)=a_q(t)\cdot\exp(j\phi_q(t)). \tag{1}$$

The baseband circuit 306 may be configured to determine an interference amplitude value $a_v(t)$ based on the estimated interference signal q(t), a reference signal u and a formula (2):

$$a_v(t)=\frac{|q(t)|}{u}. \tag{2}$$

In an example, the reference signal may be constant in time.

The baseband circuit 306 may be configured to determine a first interference reference signal l(t) based on the estimated interference signal q(t) and an threshold amplitude A. The baseband circuit 306 may be configured to determine a threshold amplitude value $A_v$ based on the threshold amplitude A, the reference signal u and a formula (3):

$$A_v=\frac{|A|}{u}. \tag{3}$$

In an example, the baseband circuit 306 may be configured to determine the threshold amplitude A based on an amplitude of a noise signal that is included in the received signal. The threshold amplitude A may be an average amplitude of the noise signal.

The baseband circuit 306 may be configured to determine the first interference reference signal l(t) based on the interference amplitude value $a_v(t)$, the reference signal u, the phase $\phi_q(t)$ and a formula (4) if the amplitude value $a_v(t)$ is greater than the threshold amplitude value $A_v$:

$$l(t)=\frac{1}{a_v(t)}\cdot u\cdot\exp(-j\phi_q(t)). \tag{4}$$

Thus, the baseband circuit 306 may be configured to efficiently determine a signal that is suitable to be multiplied with the received signal to filter out the interference signal. Further, the baseband circuit 306 may be configured to determine an interference reference signal that may be robust against an interference estimation error, e.g. an amplitude error, of the interference signal. Moreover, the baseband circuit 306 may be configured to effectively determine an interference reference signal that is suitable to map a multiplied interference signal component to a predefined frequency range and spreads the other component over a large frequency range.

The baseband circuit 306 may be configured to determine the first interference reference signal l(t) based on the threshold amplitude value $A_v$, the interference amplitude value $a_v(t)$, the reference signal u, the phase $\phi_q(t)$ and a formula (5) if the amplitude value $a_v(t)$ is smaller than the threshold amplitude value $A_v$:

$$l(t)=\left(\frac{1}{A_v}+\frac{2}{\pi}\cdot\frac{1}{A_v}\cdot\cos\left(\frac{\pi}{2}\cdot\frac{a_v(t)}{A_v}\right)\right)\cdot u\cdot\exp(-j\phi_q(t)). \tag{5}$$

Thus, the baseband circuit 306 may be configured to reliably determine an interference reference signal based on a small amplitude of an estimated interference signal.

Further variations of the interference reference signal are possible. For example, the baseband circuit 306 may be configured to determine the interference reference signal based on a factor c and a formula (5a):

$$l(t) = \left(\frac{1}{A_v} + c \cdot \frac{1}{A_v} \cdot \cos\left(\frac{\pi}{2} \cdot \frac{a_v(t)}{A_v}\right)\right) \cdot u \cdot \exp(-j\phi_q(t)). \quad (5a)$$

In an example, the factor c may be 1.

The baseband circuit 306 may be configured to determine a multiplication signal m(t) based on the first signal r(t), the first interference reference signal l(t) and a formula (6):

$$m(t)=r(t)\cdot l(t). \quad (6)$$

Thus, the baseband circuit 306 may be configured to effectively determine a signal that includes an interference signal of a received signal in a frequency range and that excludes a major part of a difference signal based on a difference of the received signal and the interference signal from the frequency range.

A difference signal y(t) may be related with the received signal r(t) and the estimated interference signal q(t) based on a formula (7):

$$y(t)=r(t)-q(t). \quad (7)$$

Further, the baseband circuit 306 may be configured to map the estimated interference signal q(t) to the frequency range based on the difference signal y(t) and a formula (8):

$$m(t)=l(t)\cdot y(t)+l(t)\cdot q(t). \quad (8)$$

The baseband circuit 306 may include a linear filter circuit. Further, the linear filter circuit may be configured to filter based on a band rejection filter. The baseband circuit 306 may be configured to filter the multiplication signal m(t) to form a filtered signal v(t) based on a convolution of an impulse response function h(t) with the multiplication signal m(t) and a formula (9):

$$v(t)=h(t)*m(t). \quad (9)$$

Thus, the baseband circuit 306 may be configured to efficiently filter an interference signal from the multiplication signal in a simple manner. The baseband circuit 306 may be configured to preserve a major part of the difference signal y(t).

The filter circuit 306 may be configured to provide the filtered signal v(t) to the baseband circuit 306.

The baseband circuit 306 may be configured to determine a process reference signal w(t) based on the first interference reference signal l(t), the reference signal u and a formula (10):

$$w(t) = \frac{1}{l(t)} \cdot u. \quad (10)$$

The baseband circuit 306 may be configured to determine a process signal z(t) based on the filtered signal v(t), the process reference signal w(t) and a formula (11):

$$z(t)=v(t)\cdot w(t). \quad (11)$$

Thus, the baseband circuit 306 may be configured to efficiently determine a process signal in a simple manner. Further, the baseband circuit 306 may be configured to determine a process signal that is only minimally degraded by the interference suppression filtering. Moreover, the baseband circuit 306 may be configured to determine the process signal in a multiplicative interference cancellation process that may have a reduced susceptability to constant offset errors in the estimation of the interference signal. Further, the baseband circuit 306 may be configured to determine the process signal in a manner that maps a time dependent error in the estimation of the interference signal to first frequency ranges that may be centered around frequencies of the interference signal. The multiplicative interference cancellation process based on a filter that filters based on a filter frequency range that may be greater than the first frequency range may reliably suppress the interference signal. The baseband circuit 306 may be configured to effectively restore a major part of the difference signal.

In an example, the baseband circuit 306 may be configured to determine a second interference reference signal $l_2$ (t) based on the interference amplitude value $a_v(t)$, the reference signal u, the phase $\phi_q$, a phase term ψ and a formula (12) if the amplitude value $a_v(t)$ is greater than the threshold amplitude value $A_v$:

$$l_2(t) = \frac{1}{a_v(t)} \cdot u \cdot \exp(-j(\phi_q(t) + \psi)). \quad (12)$$

Further, the baseband circuit 306 may be configured to determine the multiplication signal m(t) based on the second interference reference signal $l_2(t)$ instead of the first interference reference signal l(t). Moreover, the baseband circuit 306 may be configured to determine the process reference signal w(t) based on the second interference reference signal $l_2$ (t) instead of the first interference reference signal l(t). Thus, the baseband circuit 306 may be configured to flexibly determine interference signals based on signal manipulation requirements.

In an example, the baseband circuit 306 may be configured to sample the first signal at a higher sampling rate than the Nyquist frequency.

In an example, the baseband circuit 306 may be configured to process signals based on digital signal processing.

In an example, the baseband circuit 306 may be configured to process signals based on analog signal processing.

Thus, the baseband circuit 306 may be configured to efficiently and reliably determine the multiplication signal.

In an example, the baseband circuit 306 may be configured to determine a plurality of interference reference signals $l_1(t), \ldots, l_n(t)$ such that the first interference reference signal l(t) is equivalent to the product of the plurality of interference reference signals $l_1(t), \ldots, l_n(t)$, wherein n may be a natural number. Further, instead of determining the multiplication signal m(t) by the formula (6) the baseband circuit 306 may be configured to determine the multiplication signal m(t) by a formula (13):

$$m(t)=l_1(t)\cdot \ldots \cdot l_n(t). \quad (13)$$

In an example, the communication device 302 may be a base station.

In an example, the communication device 302 may be a terminal communication device.

In an example, the baseband circuit 306 may be configured to determine the multiplication signal m(t) only based on frequency ranges of the received signal that include interference signals, respectively. Further, the baseband circuit 306 may be configured to determine the filtered signal v(t) only if a multiplication signal m(t) is determined. Thus, the communication device may be configured to efficiently filter the received signal.

In an example, the baseband circuit 306 may be configured to determine the multiplication signal based on a second frequency range of the first signal that is adjacent to a third frequency range of the first signal that includes an interference signal. Thus, the communication device may be configured to reliably filter the received signal.

In an example, the baseband circuit 306 may be configured to determine the first interference reference signal l(t) such that first amplitudes of a multiplication reference signal represented in the frequency domain are smaller than a second threshold amplitude. The multiplication reference signal may be based on a multiplication of the estimated interference signal q(t) with the first interference reference signal l(t). The first amplitudes may correspond to first frequencies related to the multiplication reference signal represented in the frequency domain. The first frequencies may be not included in the filter frequency range. Thus, the baseband circuit 306 may be configured to effectively suppress the interference signal.

In an example, the second threshold amplitude may be half as great as an average amplitude of the estimated interference signal. Thus, the baseband circuit 306 may be configured to effectively filter the interference signal.

In an example, the received signal may include a third signal. The baseband circuit 306 may be configured to determine the first interference reference signal l(t) such that second amplitudes of the third signal represented in the frequency domain are smaller than a third threshold amplitude. The second amplitudes may correspond to second frequencies related to the third signal represented in the frequency domain. The filter frequency range may include the second frequencies. Thus, the baseband circuit 306 may be configured to effectively filter the interference signal and conserve the third signal.

In an example, the third threshold amplitude may be a maximum amplitude of the third signal. Thus, the baseband circuit 306 may be configured to preserve a major part of the third signal.

In an example, the baseband circuit 306 may be configured to filter the multiplication signal m(t) based on a suppression of signal components that may be in the filter frequency range in the frequency domain.

It should be noted that aspects of the communication device 302 may be combined with aspects of the communication device 202 based on FIG. 2. The baseband circuit 306 may be based on the circuit 206 based on FIG. 2.

Figure 4:
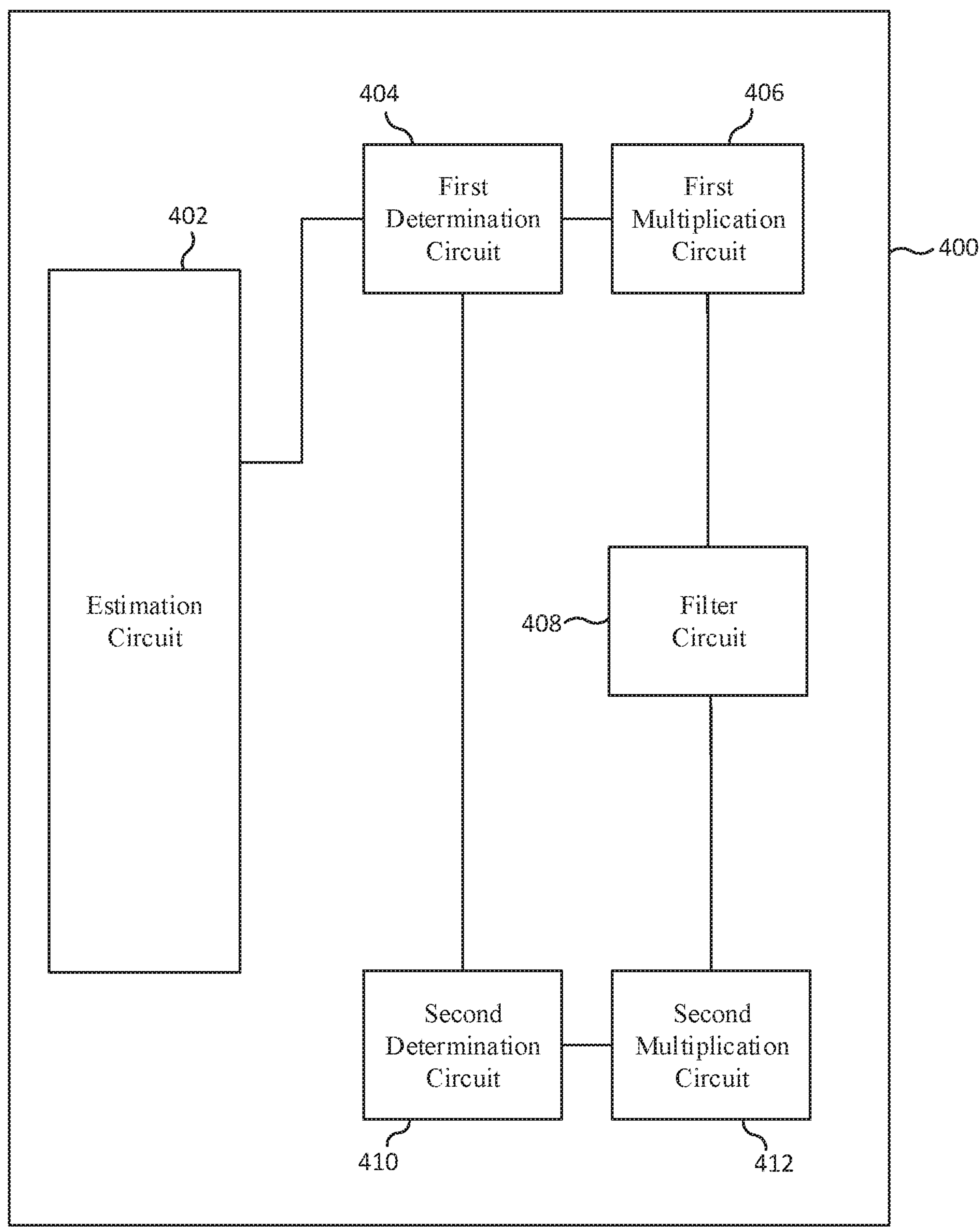
FIG. 4 shows a schematic diagram of an exemplary baseband circuit that may include an estimation circuit, a first determination circuit, a first multiplication circuit, a filter circuit, a second determination circuit and a second multiplication circuit.

FIG. 4 shows a schematic diagram of an exemplary baseband circuit 400 that may include an estimation circuit 402, a first determination circuit 404, a first multiplication circuit 406, a filter circuit 408, a second determination circuit 410 and a second multiplication circuit 412. The estimation circuit 402 may be connected with the first determination circuit 404 and the second determination circuit 410. The first determination circuit 404 may be connected with the first multiplication circuit 406. The second determination circuit 410 may be connected with the first multiplication circuit 404 and the second multiplication circuit 412. The filter circuit 408 may be connected with the first multiplication circuit 406 and the second multiplication circuit 412.

The estimation circuit 402 may be configured to estimate the interference signal q(t). Further, the estimation circuit 402 may be configured to provide the estimated interference signal q(t) to the first determination circuit 404.

The first determination circuit 404 may be configured to determine the first interference reference signal l(t). Further, the first determination circuit 404 may be configured to provide the first interference reference signal l(t) to the first multiplication circuit 406 and the second determination circuit 410.

The first multiplication circuit 406 may be configured to determine the multiplication signal m(t). Further, the first multiplication circuit 406 may be configured to provide the multiplication signal m(t) to the filter circuit 408.

The filter circuit 408 may be configured to filter the multiplication signal m(t) to form the filtered signal v(t). Further, the filter circuit 408 may be configured to provide the filtered signal v(t) to the second multiplication circuit 412.

The second determination circuit 410 may be configured to determine the process reference signal w(t). Further, the second determination circuit 410 may be configured to provide the process reference signal w(t) to the second multiplication circuit 412.

The second multiplication circuit 412 may be configured to determine the process signal z(t) based on the multiplication of the process reference signal w(t) with the filtered signal v(t).

In an example, the filter circuit 408 may be a bandgap filter.

In an example, the filter circuit 408 may be a DC notch filter.

Thus, by a high degree of compartmentalization, the communication device 400 may be configured to efficiently filter the received signal.

The baseband circuit 400 may be based on the baseband circuit 306 based on FIG. 3.

It should be noted that aspects of the baseband circuit 400 may be combined with aspects of the baseband circuit 306 based on FIG. 3 and the circuit 206 based on FIG. 2.

Figure 5:
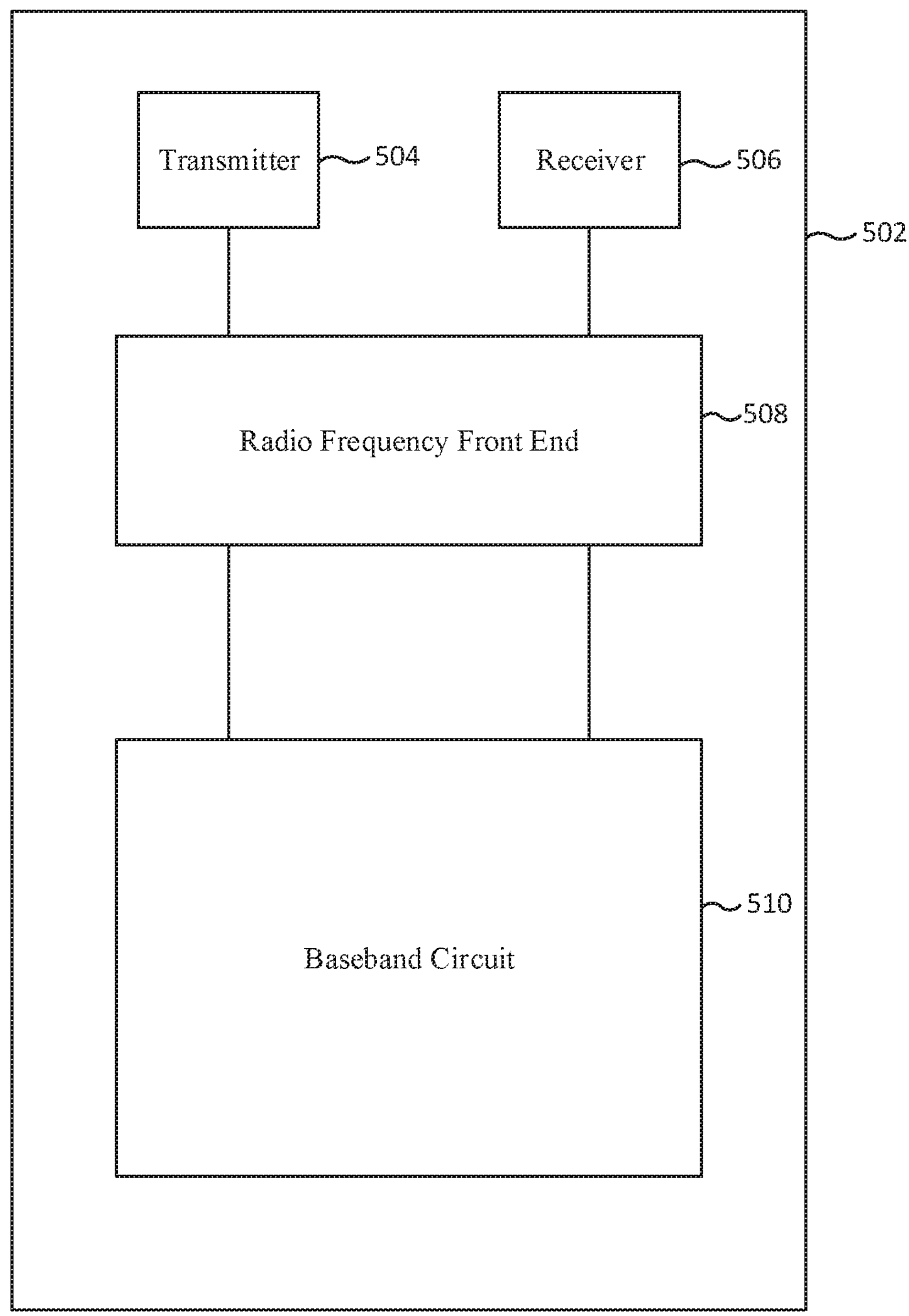
FIG. 5 shows a schematic diagram of an exemplary communication device that may include a transmitter, a receiver, a radio frequency front end and a baseband circuit.

FIG. 5 shows a schematic diagram of an exemplary communication device 502 that may include a transmitter 504, a receiver 506, a radio frequency front end 508 and a baseband circuit 510. The baseband circuit 510 may be configured to provide a first signal to the radio frequency front end 508. The radio frequency front end 508 may be configured to convert the first signal to a radio frequency and to provide the converted first signal to the transmitter 504. The transmitter 504 may be configured to transmit the converted first signal. The baseband circuit 510 may be based on the baseband circuit 400.

In an example, the baseband circuit 510 may be provided on a chip that is separated from the radio frequency front end 508, the receiver 506 and the transmitter 504.

The receiver 506 may be configured to receive a second signal that may include an interference signal based on the transmitted first signal. Further, the receiver 506 may be configured to provide the received second signal to the radio frequency front end 508.

The radio frequency front end 508 may be configured to determine a first process signal based on the received second signal, the first signal and a radio frequency interference cancellation process. Further, the radio frequency front end 508 may be configured to provide the first process signal to the baseband circuit 510.

The baseband circuit 510 may be configured to estimate the interference signal based on the first signal. Further, the baseband circuit 510 may be configured to estimate a second interference signal based on the first signal and the radio frequency interference cancellation process to form an estimated second interference signal b(t).

The baseband circuit 510 may be configured to perform a multiplicative signal interference cancellation process based on the baseband circuit 306 based on FIG. 3. The baseband circuit 510 may be configured to perform the multiplicative signal interference cancellation process based on the first process signal instead of the first signal and the estimated second interference signal b(t) instead of the estimated interference signal.

The baseband circuit 510 may be configured to determine the first interference reference signal l(t) based on an amplitude $a_b(t)$ of the estimated second interference signal b(t) instead of the amplitude $a_q(t)$ and a phase $\phi_b(t)$ of the estimated second interference signal b(t) instead of the phase $\phi_q$. The baseband circuit 510 may be configured to determine the interference amplitude value $a_v(t)$ based on the estimated second interference signal b(t) instead of the estimated interference signal q(t).

Further, the baseband circuit 510 may be configured to determine the multiplication signal m(t) based on the first process signal instead of the first signal r(t).

Thus, by providing a first filter stage in the radio frequency front end 508 and a second filter stage in the baseband circuit 510, the communication device 502 may be configured to effectively filter the received signal in a reliable manner based on reduced accuracy requirements on the first filter stage.

It should be noted that aspects of the communication device 502 of FIG. 5 may be combined with aspects of the communication devices based on FIG. 1, FIG. 2, FIG. 3 and FIG. 4.

Figure 6:
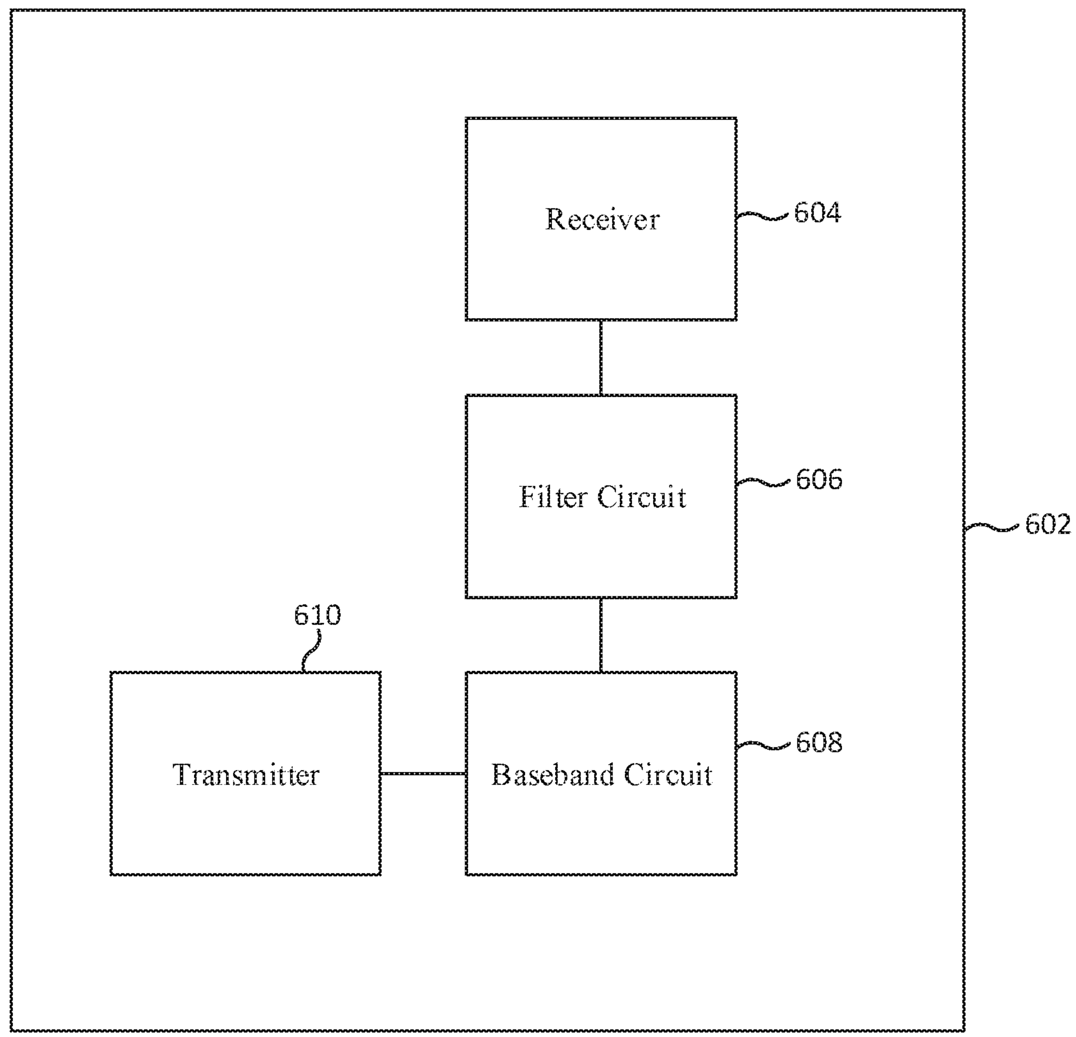
FIG. 6 shows a schematic diagram of an exemplary communication device that may include a receiver, a filter circuit, a baseband circuit and a transmitter.

FIG. 6 shows a schematic diagram of an exemplary communication device 602 that may include a receiver 604, a filter circuit 606, a baseband circuit 608 and a transmitter 610. The baseband circuit 608 may be based on the baseband circuit 306 of FIG. 3.

The baseband circuit 608 may be configured to provide a first signal to the transmitter 610. The transmitter 610 may be configured to transmit the first signal. Further, the receiver 604 may be configured to receive a second signal that may include a first interference signal based on the transmitted first signal.

The baseband circuit 608 may be configured to provide a filter information based on the first signal to the filter circuit 606. The filter circuit 606 may be configured to filter the second signal based on the filter information to form a filtered first signal f(t) Further, the filter circuit 606 may be configured to provide the filtered first signal f(t) to the baseband circuit 608.

The filtered first signal f(t) may include a second interference signal of the filtered first signal f(t). The second interference signal may be based on the first interference signal, the filter circuit 606 and the filter information. The baseband circuit 608 may be configured to determine an estimated second interference signal based on the second interference signal of the filtered first signal f(t), the filter circuit 606 and the filter information.

The baseband circuit 608 may be configured to determine the first interference reference signal l(t) based on an amplitude of the estimated second interference signal instead of the amplitude $a_q(t)$ and a phase of the estimated second interference signal b(t) instead of the phase $\phi_q(t)$. The baseband circuit 608 may be configured to determine the interference amplitude value $a_v(t)$ based on the estimated second interference signal instead of the interference signal q(t).

Further, the baseband circuit 608 may be configured to determine the multiplication signal m(t) based on the filtered first signal f(t) instead of the first signal r(t).

The baseband circuit 608 may be configured to determine the process signal z(t) based on the multiplicative interference cancellation process based on FIG. 3. Thus, by providing a first filter stage that is configured to filter before the multiplicative signal interference cancellation, the communication device may be configured to effectively filter the received signal in a reliable and uncomplex manner.

In an example, the filter circuit 606 may be a linear filter circuit.

It should be noted that aspects of the communication device 602 may be combined with aspects of the communication devices based on FIG. 1, FIG. 2, FIG. 3, FIG. 4 and FIG. 5.

Figure 7:
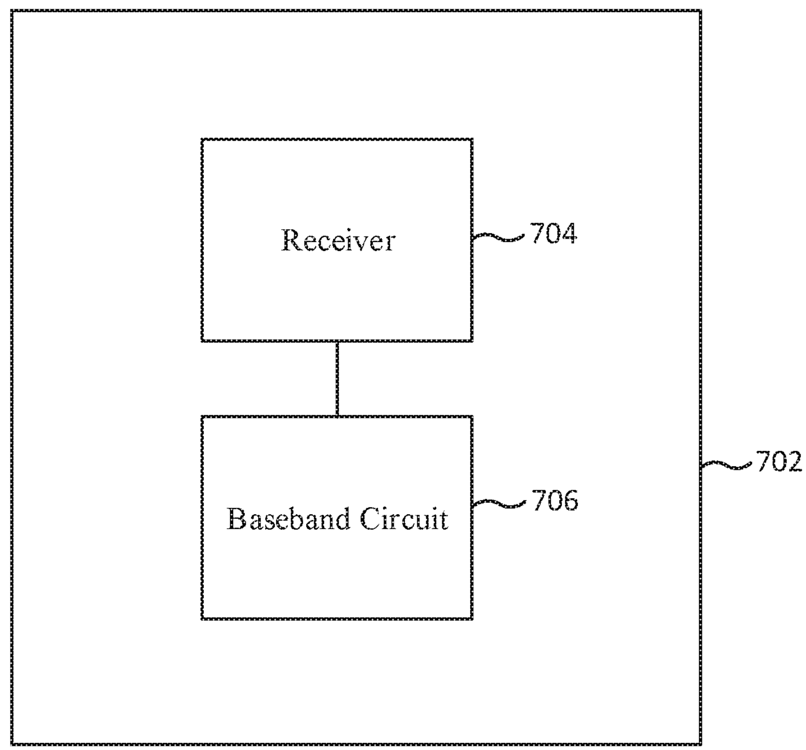
FIG. 7 shows a schematic diagram of an exemplary communication device that may include a receiver and a baseband circuit.

FIG. 7 shows a schematic diagram of an exemplary communication device 702 that may include a receiver 704 and a baseband circuit 706. The baseband circuit 706 may be connected with the receiver 704. The baseband circuit 706 may be based on the baseband circuit 306 based on FIG. 3.

The receiver 704 may be configured to receive a signal that may include an interference signal $q(t_d)$. The interference signal may be based on a transmitted signal that may be transmitted at a first time $t_d$, a second time t, a delay time d and a formula (14):

$$t_d=t-d. \tag{14}$$

In an example, the delay time d may be a travel time in which the transmitted signal travels to the receiver 704.

In an example, the transmitted signal may be transmitted by the communication device 702.

The receiver 704 may be configured to receive the first signal and provide the first signal to the baseband circuit 706. The receiver 704 may be configured to receive the first signal at the second time t.

The baseband circuit 706 may be configured to determine the first interference reference signal based on an amplitude $a_q(t_d)$ of the estimated interference signal $q(t_d)$ at the first time $t_d$ instead of the amplitude $a_q(t)$ at the second time t and a phase $\phi_q(t_d)$ of the estimated interference signal $q(t_d)$ at the first time $t_d$ instead of the phase $\phi_q(t)$ at the second time t.

Further, the baseband circuit 706 may be configured to determine the interference amplitude value $a_v(t_d)$ based on the estimated interference signal $q(t_d)$ at the first time $t_d$.

The baseband circuit 706 may be configured to determine the first interference reference signal l(t) at the second time t based on the estimated interference signal $q(t_d)$ at the first time $t_d$.

Thus, the baseband circuit 706 may be configured to accurately take into account a latency between the transmitted signal and the received signal in a filter process.

It should be noted that aspects of the communication device 702 may be combined with aspects of the communication devices based on FIG. 1, FIG. 2, FIG. 3, FIG. 4, FIG. 5 and FIG. 6.

Figure 8:
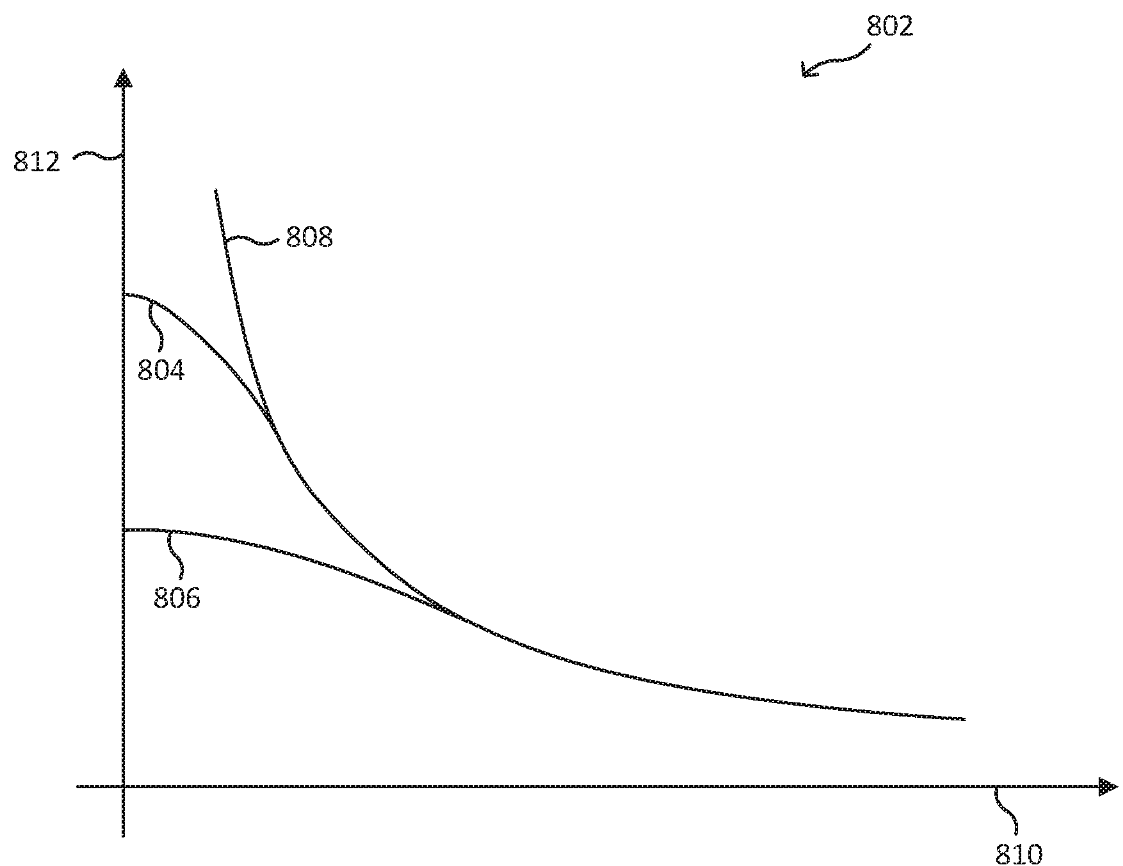
FIG. 8 shows a schematic diagram of a first amplitude function, a second amplitude function and an inverse function.

FIG. 8 shows a schematic diagram 802 of a first amplitude function 804, a second amplitude function 806 and an inverse function 808. The diagram 802 may have a first axis 810 that may indicate an amplitude value of the estimated interference signal based on units of the reference signal u and a second axis 812 that may indicate an amplitude value of the first interference reference signal l(t) based on units of the reference signal u.

The amplitude functions 804 and 806 may be based on an absolute value of the interference reference signal based on formula (4) and formula (5) and threshold amplitude values. The first amplitude function 804 may be based on a first threshold amplitude value $A_v=0.4$. The second amplitude function 806 may be based on a second threshold amplitude value $A_v=0.77$.

The inverse function 808 may indicate an inverse amplitude value 1/a as a function of an amplitude value a.

Figure 9:
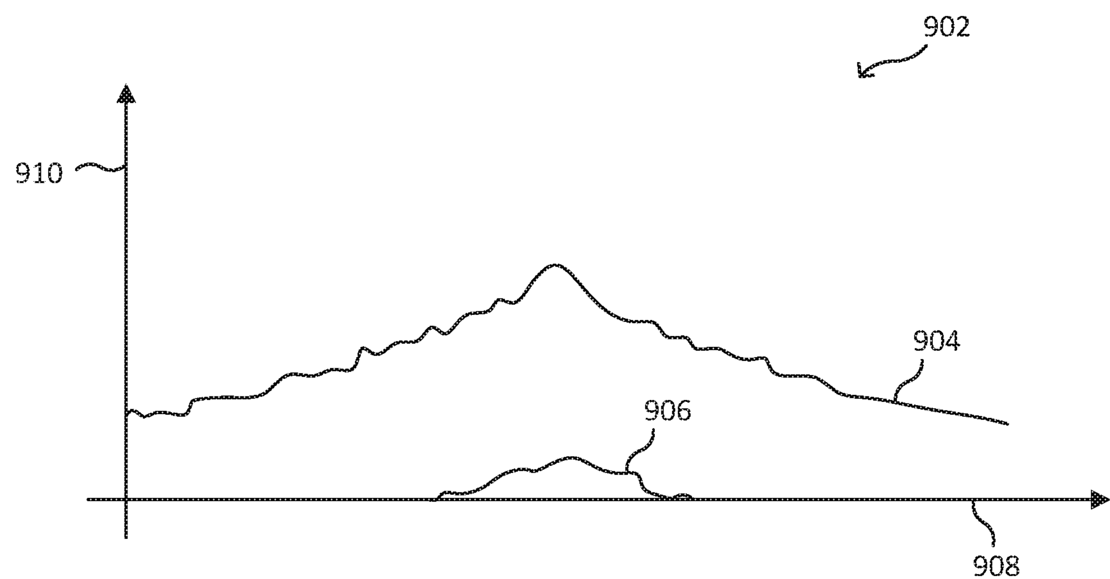
FIG. 9 shows a schematic diagram of a first multiplication signal and a first interference component signal based on the first threshold amplitude value.

FIG. 9 shows a schematic diagram 902 of a first multiplication signal 904 and a first interference component signal 906 based on the first threshold amplitude value. The diagram 902 may have a first axis 908 that may indicate a frequency of a signal component in the frequency domain and a second axis 910 that may indicate an amplitude of the signal component.

The first multiplication signal 904 may be based on the multiplication signal m(t) as formed based on formulas (4), (5) and (6) or formulas (4), (5) and (13) and the received first signal. The first interference component signal 906 may be a component signal i(t) based on the estimated interference signal q(t), the first interference reference signal l(t), the first threshold amplitude value and a formula (15):

$$i(t)=l(t)\cdot q(t). \quad (15)$$

The component signal i(t) may be a component of the multiplication signal m(t) based on formula (8).

Figure 10:
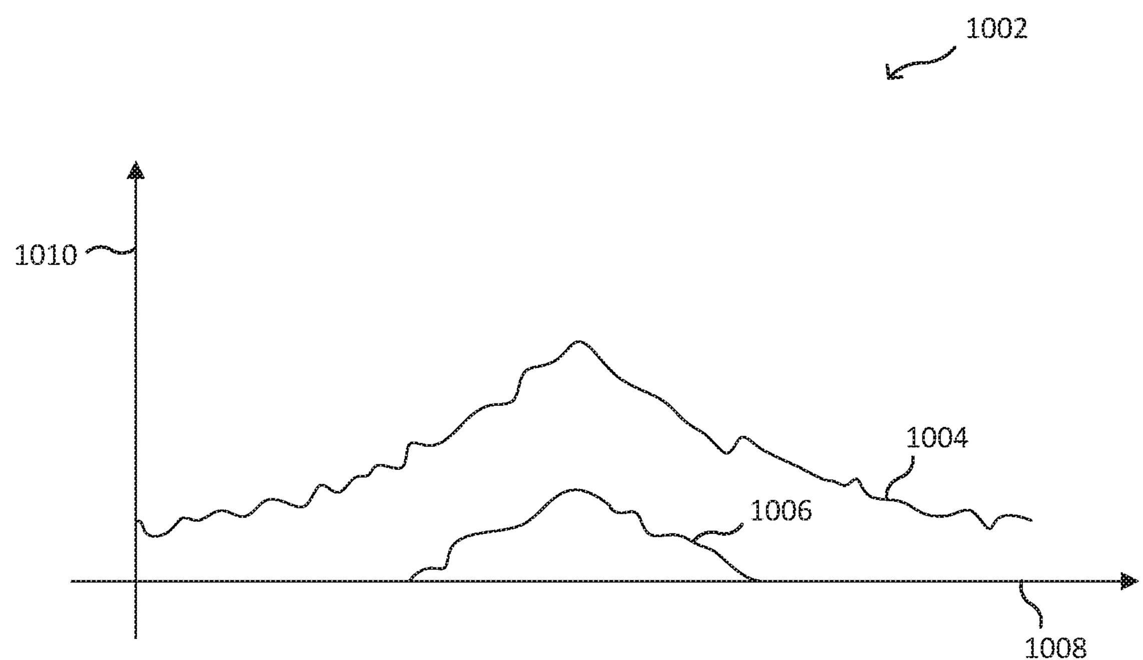
FIG. 10 shows a schematic diagram of a second multiplication signal and a second interference component signal based on the second threshold amplitude value.

FIG. 10 shows a schematic diagram 1002 of a second multiplication signal 1004 and a second interference component signal 1006 based on the second threshold amplitude value. The diagram 1002 may have a first axis 1008 that may indicate a frequency of a signal component in the frequency domain and a second axis 1010 that may indicate an amplitude of the signal component.

The second multiplication signal 1004 may be based on the multiplication signal m(t) and the received first signal. The second interference component signal 1006 may be the component signal i(t) based on the estimated interference signal q(t), the first interference reference signal l(t) and the second threshold amplitude value.

An average ratio of the second interference component signal 1006 to the second multiplication signal 1004 may be greater than an average ratio of the first interference component signal 906 to the first multiplication signal 904.

Figure 11:
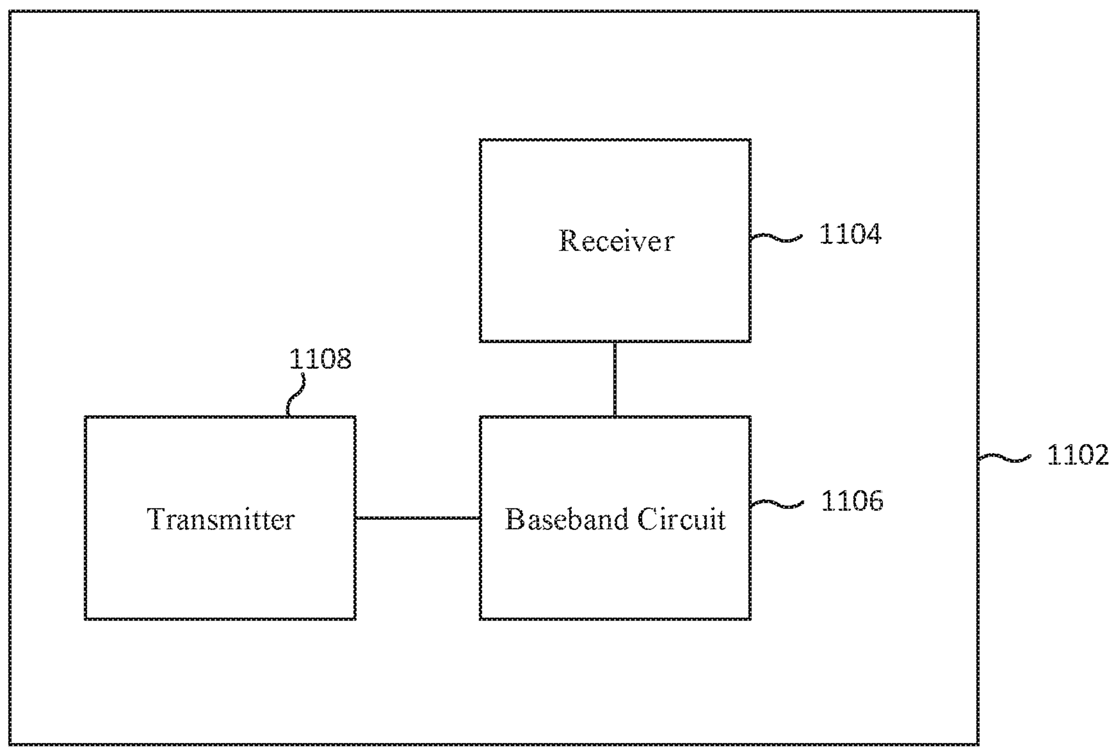
FIG. 11 shows a schematic diagram of an exemplary communication device that may include a receiver, a baseband circuit and a transmitter.

FIG. 11 shows a schematic diagram of an exemplary communication device 1102 that may include a receiver 1104, a baseband circuit 1106 and a transmitter 1108.

In an example, the baseband circuit 306 may be configured to determine the first interference reference signal l(t) based on the threshold amplitude value $A_v$, the interference amplitude value $a_v(t)$, the reference signal u, the phase $\phi_q(t)$ and a formula (16) if the amplitude value $a_v(t)$ is smaller than the threshold amplitude value $$l(t)=\frac{1}{A_v}\cdot u\cdot \exp(-j\phi_q(t)). \quad (16)$$

Thus, the communication device 1102 may be configured to determine the first interference signal in a simple and efficient manner.

All other aspects of the communication device 1102 may be aspects of the communication device 302 of FIG. 3.

It should be noted that aspects of the communication device 1102 may be combined with aspects of the communication devices based on FIG. 1, FIG. 2, FIG. 3, FIG. 4, FIG. 5, FIG. 6 and FIG. 7.

It should be noted that aspects of the communication device 1102 may be combined with aspects of the diagrams based on FIG. 8, FIG. 9 and FIG. 10.

Figure 12:
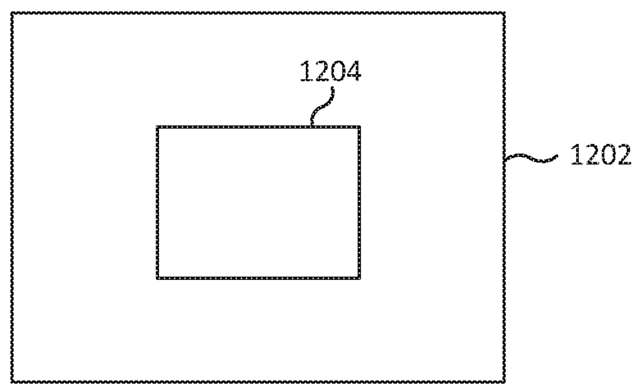
FIG. 12 shows an exemplary device.

FIG. 12 shows an exemplary device 1202 that may include a receiver 1204 configured to receive a signal. The device may be configured to multiplying the received signal with a predetermined interference reference signal in the time domain to form a multiplication signal and filtering the multiplication signal to form a filtered signal. Thus, the device may be flexible and configured to reliably filter the received signal based on a reduced accuracy requirement for the filter process.

It should be noted that aspects of the device 1202 may be combined with aspects of the communication devices based on FIG. 1, FIG. 2, FIG. 3, FIG. 4, FIG. 5, FIG. 6, FIG. 7 and FIG. 11.

It should be noted that aspects of the device 1202 may be combined with aspects of the diagrams based on FIG. 8, FIG. 9 and FIG. 10.

Figure 13:
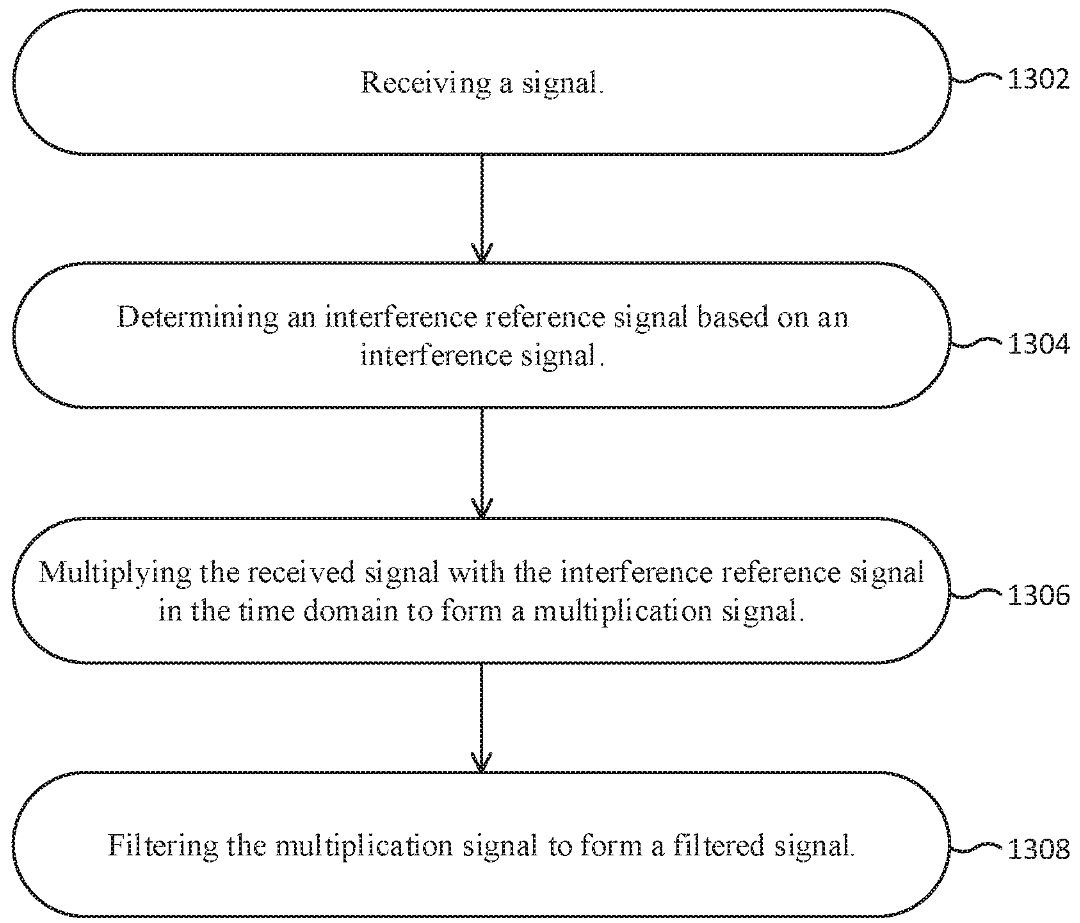
FIG. 13 shows an exemplary method for radio communication.

FIG. 13 shows an exemplary method for radio communication.

The method may include, in 1302, receiving a signal.

The method may include, in 1304, determining an interference reference signal based on an interference signal.

The method may further include, in 1306, multiplying the received signal with the interference reference signal in the time domain to form a multiplication signal.

The method may further include, in 1308, filtering the multiplication signal to form a filtered signal.

It should be noted that aspects of the above described method may be combined with aspects of the communication devices based on FIG. 1, FIG. 2, FIG. 3, FIG. 4, FIG. 5, FIG. 6, FIG. 7 and FIG. 11 and aspects of the diagrams based on FIG. 8, FIG. 9 and FIG. 10.

In the following, various aspects of this disclosure will be illustrated:

Example 1 is a communication device. The communication device may include a receiver configured to receive a signal. The communication device may further include a circuit configured to determine an interference reference signal based on an interference signal, multiply the received signal with the interference reference signal in the time domain to form a multiplication signal and filter the multiplication signal to form a filtered signal.

In Example 2, the subject matter of Example 1 can optionally include that the communication device may further include a transmitter configured to transmit a second signal, wherein the interference signal may be predetermined based on the second signal.

In Example 3, the subject matter of Example 1 can optionally include that the the interference reference signal may be determined based on an amplitude of the interference signal and a phase of the interference signal.

In Example 4, the subject matter of Example 3 can optionally include that the the interference reference signal may be determined such that the amplitude of the interference reference signal may be based on an inverse of the amplitude of the interference signal and the phase of the interference reference signal may be based on an inverse of the phase of the interference signal.

In Example 5, the subject matter of any one of Examples 3 to 4 can optionally include that the interference reference signal may be determined such that the amplitude of the interference reference signal may be smaller than a limiting maximum amplitude.

In Example 6, the subject matter of any one of Examples 4 to 5 can optionally include that the interference reference signal may be determined such that a ratio based on the amplitude of the interference reference signal and the amplitude of the interference signal may be constant in time.

In Example 7, the subject matter of any one of Examples 4 to 6 can optionally include that the interference reference signal may be determined such that a difference based on the phase of the interference reference signal and the phase of the interference signal may be constant in time.

In Example 8, the subject matter of any one of Examples 3 to 7 can optionally include that the phase of the interference signal may be a first phase $\phi_1$, wherein the interference reference signal may be determined such that the phase of the interference reference signal may be a second phase $\phi_2 = \phi_1$.

In Example 9, the subject matter of any one of Examples 4 to 8 can optionally include that the interference reference signal may be determined such that the amplitude of the interference reference signal may be proportional to the inverse of the amplitude of the interference signal if the amplitude of the interference signal is greater than a threshold amplitude.

In Example 10, the subject matter of any one of Examples 3 to 9 can optionally include that an interference amplitude value a may be proportional to the amplitude of the interference signal based on a factor, wherein the interference reference signal may be determined such that the amplitude of the interference reference signal may be proportional to a first amplitude value $$f(a) = \frac{1}{a}$$

if the amplitude of the interference signal is greater than the threshold amplitude.

In Example 11, the subject matter of Example 10 can optionally include that a threshold amplitude value A may be proportional to the threshold amplitude based on the factor, wherein the interference reference signal may be determined such that the amplitude of the interference reference signal may be proportional to a second amplitude value $$g(a) = \frac{1}{A} + \frac{2}{\pi} \cdot \frac{1}{A} \cdot \cos\left(\frac{\pi}{2} \cdot \frac{a}{A}\right)$$

if the interference amplitude value a is smaller than the threshold amplitude value A.

In Example 12, the subject matter of Example 11 can optionally include that the interference reference signal may be determined such that the amplitude of the interference reference signal may be proportional to the first amplitude value f(a) if the interference amplitude value a is greater than the amplitude value A.

In Example 13, the subject matter of Example 10 can optionally include that a threshold amplitude value A may be proportional to the threshold amplitude based on the factor, wherein a delay time d may be a time difference based on the second signal and the interference signal, wherein the interference amplitude value a may be a second interference amplitude value $a(t_d)$ at a first time $t_d = t - d$ based on a second time t, wherein the first amplitude value f(a) may be a first amplitude value function $$f(a, t) = \frac{1}{a(t_d)}$$

of the interference amplitude value a and the second time t, wherein the interference reference signal may be determined such that the amplitude of the interference reference signal may be proportional to the first amplitude value function $$f(a, t) = \frac{1}{a(t_d)}$$

if the second interference amplitude value $a(t_d)$ is greater than the amplitude value A.

In Example 14, the subject matter of Example 13 can optionally include that a third amplitude value function h(a, t) may be a function of the interference amplitude value a and the second time t, wherein the interference reference signal may be determined such that the amplitude of the interference reference signal may be proportional to the third amplitude value $$h(a, t) = \frac{1}{A} + \frac{2}{\pi} \cdot \frac{1}{A} \cdot \cos\left(\frac{\pi}{2} \cdot \frac{a(t_d)}{A}\right)$$

if the second interference amplitude value $a(t_d)$ is smaller than the threshold amplitude value A.

In Example 15, the subject matter of any one of Examples 13 to 14 can optionally include that the phase of the interference signal at the first time $t_d$ may be a third phase $\phi_1(t_d)$, wherein the interference reference signal may be determined such that the phase of the interference reference signal at the second time t may be a fourth phase $\phi_2(t) = -\phi_1(t_d)$.

In Example 16, the subject matter of any one of Examples 10 to 15 can optionally include that the factor may be constant in time.

In Example 17, the subject matter of any one of Examples 1 to 16 can optionally include that the multiplication signal may be filtered based on a filter frequency range, wherein the interference reference signal may be determined based on the filter frequency range.

In Example 18, the subject matter of Example 17 can optionally include that the interference reference signal may be determined such that first amplitudes of a multiplication reference signal represented in the frequency domain may be smaller than a second threshold amplitude, wherein the multiplication reference signal may be based on a multiplication of the interference signal with the interference reference signal, wherein the first amplitudes may correspond to first frequencies related to the multiplication reference signal represented in the frequency domain, wherein the first frequencies may be not included in the filter frequency range.

In Example 19, the subject matter of Example 18 can optionally include that the second threshold amplitude may be half as great as an average amplitude of the interference signal.

In Example 20, the subject matter of any one of Examples 18 to 19 can optionally include that the received signal may include a third signal, wherein the interference reference signal may be determined such that second amplitudes of the third signal represented in the frequency domain may be smaller than a third threshold amplitude, wherein the second amplitudes may correspond to second frequencies related to the third signal represented in the frequency domain, wherein the filter frequency range may include the second frequencies.

In Example 21, the subject matter of Example 20 can optionally include that the third threshold amplitude may be a maximum amplitude of the third signal.

In Example 22, the subject matter of any one of Examples 17 to 21 can optionally include that the communication device may further include a filter circuit configured to filter the multiplication signal based on the filter frequency range.

In Example 23, the subject matter of Example 22 can optionally include that the filter circuit may be a band rejection filter.

In Example 24, the subject matter of any one of Examples 22 to 23 can optionally include that the filter frequency range may include third frequencies, wherein third amplitudes of the multiplication signal may correspond to the third frequencies in the frequency domain, wherein the filter circuit may be configured to filter out the third amplitudes.

In Example 25, the subject matter of any one of Examples 22 to 24 can optionally include that the filter circuit may be configured to filter based on a linear filter process.

In Example 26, the subject matter of any one of Examples 1 to 25 can optionally include that the circuit may be configured to determine a second interference reference signal, wherein the circuit may be configured to multiply the filtered signal with the second interference reference signal to form a second multiplication signal.

In Example 27, the subject matter of Example 26 can optionally include that the circuit may be configured to determine the second interference reference signal based on the interference reference signal.

In Example 28, the subject matter of any one of Examples 26 to 27 can optionally include that the second interference reference signal may be determined based on an inverse of the interference reference signal.

In Example 29, the subject matter of Example 28 can optionally include that the second interference reference signal may be determined such that an amplitude of the second interference reference signal may be based on an inverse of the amplitude of the interference reference signal and a phase of the second interference reference signal may be based on an inverse of the phase of the interference reference signal.

In Example 30, the subject matter of Example 29 can optionally include that the second interference reference signal may be determined such that a ratio based on the amplitude of the interference reference signal and the amplitude of the interference signal may be constant in time.

In Example 31, the subject matter of any one of Examples 29 to 30 can optionally include that the second interference reference signal may be determined such that a difference based on the phase of the second interference reference signal and the phase of the interference reference signal may be constant in time.

In Example 32, the subject matter of any one of Examples 29 to 31 can optionally include that the second interference reference signal may be determined such that the phase of the second interference reference signal may be the first phase $\phi_1$ of the interference signal.

In Example 33, the subject matter of any one of Examples 29 to 32 can optionally include that the second interference reference signal may be determined such that the amplitude of the second interference reference signal may be the inverse of the amplitude of the predetermined interference signal.

In Example 34, the subject matter of any one of Examples 1 to 33 can optionally include that the circuit may be configured to determine the interference reference signal based on digital signal processing.

In Example 35, the subject matter of any one of Examples 1 to 33 can optionally include that the circuit may be configured to determine the interference reference signal based on analog signal processing.

In Example 36, the subject matter of any one of Examples 1 to 35 can optionally include that the circuit may be a baseband circuit.

In Example 37, the subject matter of any one of Examples 1 to 36 can optionally include that the received signal and/or the interference signal may be signals of a predefined frequency range.

Example 38 is a method for radio communication. The method may include receiving a signal, determining an interference reference signal based on an interference signal, multiplying the received signal with the interference reference signal in the time domain to form a multiplication signal and filtering the multiplication signal to form a filtered signal.

In Example 39, the subject matter of Example 38 can optionally include that the method may further include transmitting a second signal, wherein the interference signal may be predetermined based on the second signal.

In Example 40, the subject matter of Example 38 can optionally include that the interference reference signal may be determined based on an amplitude of the interference signal and a phase of the interference signal.

In Example 41, the subject matter of Example 40 can optionally include that the interference reference signal may be determined such that the amplitude of the interference reference signal may be based on an inverse of the amplitude of the interference signal and the phase of the interference reference signal may be based on an inverse of the phase of the interference signal.

In Example 42, the subject matter of any one of Examples 40 to 41 can optionally include that the interference reference signal may be determined such that the amplitude of the interference reference signal may be smaller than a limiting maximum amplitude.

In Example 43, the subject matter of any one of Examples 41 to 42 can optionally include that the interference reference signal may be determined such that a ratio based on the amplitude of the interference reference signal and the amplitude of the interference signal may be constant in time.

In Example 44, the subject matter of any one of Examples 41 to 43 can optionally include that the interference reference signal may be determined such that a difference based on the phase of the interference reference signal and the phase of the interference signal may be constant in time.

In Example 45, the subject matter of any one of Examples 40 to 44 can optionally include that the phase of the interference signal may be a first phase $\phi_1$, wherein the interference reference signal may be determined such that the phase of the interference reference signal may be a second phase $\phi_2=-\phi_1$.

In Example 46, the subject matter of any one of Examples 41 to 45 can optionally include that the interference reference signal may be determined such that the amplitude of the interference reference signal may be proportional to the inverse of the amplitude of the interference signal if the amplitude of the interference signal is greater than a threshold amplitude.

In Example 47, the subject matter of any one of Examples 40 to 46 can optionally include that an interference amplitude value a may be proportional to the amplitude of the interference signal based on a factor, wherein the interference reference signal may be determined such that the amplitude of the interference reference signal may be proportional to a first amplitude value $$f(a)=\frac{1}{a}$$

if the amplitude of the interference signal is greater than the threshold amplitude.

In Example 48, the subject matter of Example 47 can optionally include that a threshold amplitude value A may be proportional to the threshold amplitude based on the factor, wherein the interference reference signal may be determined such that the amplitude of the interference reference signal may be proportional to a second amplitude value $$g(a)=\frac{1}{A}+\frac{2}{\pi}\cdot\frac{1}{A}\cdot\cos\left(\frac{\pi}{2}\cdot\frac{a}{A}\right)$$

if the interference amplitude value a is smaller than the threshold amplitude value A.

In Example 49, the subject matter of Example 48 can optionally include that the interference reference signal may be determined such that the amplitude of the interference reference signal may be proportional to the first amplitude value f(a) if the interference amplitude value a is greater than the amplitude value A.

In Example 50, the subject matter of Examples 47 can optionally include that a threshold amplitude value A may be proportional to the threshold amplitude based on the factor, wherein a delay time d may be a time difference based on the second signal and the interference signal, wherein the interference amplitude value a may be a second interference amplitude value $a(t_d)$ at a first time $t_d=t-d$ based on a second time t, wherein the first amplitude value f(a) may be a first amplitude value function $$f(a,t)=\frac{1}{a(t_d)}$$

of the interference amplitude value a and the second time t, wherein the interference reference signal may be determined such that the amplitude of the interference reference signal may be proportional to the first amplitude value function $$f(a,t)=\frac{1}{a(t_d)}$$

if the second interference amplitude value $a(t_d)$ is greater than the amplitude value A.

In Example 51, the subject matter of Example 50 can optionally include that a third amplitude value function h(a, t) may be a function of the interference amplitude value a and the second time t, wherein the interference reference signal may be determined such that the amplitude of the interference reference signal may be proportional to the third amplitude value $$h(a,t)=\frac{1}{A}+\frac{2}{\pi}\cdot\frac{1}{A}\cdot\cos\left(\frac{\pi}{2}\cdot\frac{a(t_d)}{A}\right)$$

if the second interference amplitude value $a(t_d)$ is smaller than the threshold amplitude value A.

In Example 52, the subject matter of any one of Examples 50 to 51 can optionally include that the phase of the interference signal at the first time $t_d$ may be a third phase $\phi_1(t_d)$, wherein the interference reference signal may be determined such that the phase of the interference reference signal at the second time t may be a fourth phase $\phi_2(t)=-\phi_1(t_d)$.

In Example 53, the subject matter of any one of Examples 47 to 52 can optionally include that the factor may be constant in time.

In Example 54, the subject matter of any one of Examples 38 to 53 can optionally include that the multiplication signal may be filtered based on a filter frequency range, wherein the interference reference signal may be determined based on the filter frequency range.

In Example 55, the subject matter of Example 54 can optionally include that the interference reference signal may be determined such that first amplitudes of a multiplication reference signal represented in the frequency domain may be smaller than a second threshold amplitude, wherein the multiplication reference signal may be based on a multiplication of the interference signal with the interference reference signal, wherein the first amplitudes may correspond to first frequencies related to the multiplication reference signal represented in the frequency domain, wherein the first frequencies may be not included in the filter frequency range.

In Example 56, the subject matter of Example 55 can optionally include that the second threshold amplitude may be half as great as an average amplitude of the interference signal.

In Example 57, the subject matter of any one of Examples 55 to 56 can optionally include that the received signal may include a third signal, wherein the interference reference signal may be determined such that second amplitudes of the third signal represented in the frequency domain may be smaller than a third threshold amplitude, wherein the second amplitudes may correspond to second frequencies related to the third signal represented in the frequency domain, wherein the filter frequency range may include the second frequencies.

In Example 58, the subject matter of Example 57 can optionally include that the third threshold amplitude may be a maximum amplitude of the third signal.

In Example 59, the subject matter of any one of Examples 54 to 58 can optionally include that the method may further include filtering the multiplication signal based on the filter frequency range.

In Example 60, the subject matter of Example 59 can optionally include that the multiplication signal may be filtered based on a band rejection filter.

In Example 61, the subject matter of any one of Examples 55 to 60 can optionally include that the method may further include filtering out the third amplitudes, wherein the third amplitudes of the multiplication signal may correspond to third frequencies in the frequency domain, wherein the filter frequency range may include the third frequencies.

In Example 62, the subject matter of any one of Examples 59 to 61 can optionally include that the method may further include filtering based on a linear filter process.

In Example 63, the subject matter of any one of Examples 38 to 62 can optionally include that the method may further include determining a second interference reference signal and multiplying the filtered signal with the second interference reference signal to form a second multiplication signal.

In Example 64, the subject matter of Example 63 can optionally include that the method may further include determining the second interference reference signal based on the interference reference signal.

In Example 65, the subject matter of any one of Examples 63 to 64 can optionally include that the second interference reference signal may be determined based on an inverse of the interference reference signal.

In Example 66, the subject matter of Example 65 can optionally include that the second interference reference signal may be determined such that an amplitude of the second interference reference signal may be based on an inverse of the amplitude of the interference reference signal and a phase of the second interference reference signal may be based on an inverse of the phase of the interference reference signal.

In Example 67, the subject matter of Example 66 can optionally include that the second interference reference signal may be determined such that a ratio based on the amplitude of the interference reference signal and the amplitude of the interference signal may be constant in time.

In Example 68, the subject matter of any one of Examples 66 to 67 can optionally include that the second interference reference signal may be determined such that a difference based on the phase of the second interference reference signal and the phase of the interference reference signal may be constant in time.

In Example 69, the subject matter of any one of Examples 66 to 68 can optionally include that the second interference reference signal may be determined such that the phase of the second interference reference signal may be the first phase $\phi_1$ of the interference signal.

In Example 70, the subject matter of any one of Examples 66 to 69 can optionally include that the second interference reference signal may be determined such that the amplitude of the second interference reference signal may be the inverse of the amplitude of the predetermined interference signal.

In Example 71, the subject matter of any one of Examples 38 to 70 can optionally include that the method may further include determining the interference reference signal based on digital signal processing.

In Example 72, the subject matter of any one of Examples 38 to 70 can optionally include that the method of may further include determining the interference reference signal based on analog signal processing.

In Example 73, the subject matter of any one of Examples 38 to 72 can optionally include that the method may further include determining the interference reference signal, the filtered signal and/or the second interference signal based on a baseband frequency.

In Example 74, the subject matter of any one of Examples 38 to 73 can optionally include that the received signal and/or the interference signal may be signals of a predefined frequency range.

Example 75 may be a device. The device may include a receiver configured to receive a signal, wherein the device may be configured to multiply the received signal with a predetermined interference reference signal in the time domain to form a multiplication signal and filter the multiplication signal to form a filtered signal.

In Example 76, the subject matter of Example 75 can optionally include that the circuit may be configured to determine the interference reference signal based on an interference signal.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:

a receiver configured to receive a signal;

a circuit configured to determine an interference reference signal based on an interference signal and based on a filter frequency range such that first amplitudes of a multiplication reference signal represented in the frequency domain are smaller than a second threshold amplitude, wherein the multiplication reference signal is based on a multiplication of the interference signal with the interference reference signal, wherein the first amplitudes correspond to first frequencies related to the multiplication reference signal represented in the frequency domain, and wherein the first frequencies are not comprised in the filter frequency range;

multiply the received signal with the interference reference signal in the time domain to form a multiplication signal; and filter the multiplication signal to form a filtered signal based on the filter frequency range.

2. The communication device of claim 1, wherein the interference reference signal is determined based on an amplitude of the interference signal and a phase of the interference signal.

3. The communication device of claim 2, wherein the interference reference signal is determined such that the amplitude of the interference reference signal is based on an inverse of the amplitude of the interference signal and the phase of the interference reference signal is based on an inverse of the phase of the interference signal.

4. The communication device of claim 3, wherein the interference reference signal is determined such that a ratio based on the amplitude of the interference reference signal and the amplitude of the interference signal is constant in time.

5. The communication device of claim 3, wherein the interference reference signal is determined such that the amplitude of the interference reference signal is proportional to the inverse of the amplitude of the interference signal if the amplitude of the interference signal is greater than a threshold amplitude.

6. The communication device of claim 5, wherein an interference amplitude value $\alpha$ is proportional to the amplitude of the interference signal based on a factor, and wherein the interference reference signal is determined such that the amplitude of the interference reference signal is proportional to a first amplitude value $$f(a) = \frac{1}{a}$$

if the amplitude of the interference signal is greater than the threshold amplitude.

7. The communication device of claim 1, wherein the received signal comprises a third signal, wherein the interference reference signal is determined such that second amplitudes of the third signal represented in the frequency domain are smaller than a third threshold amplitude, wherein the second amplitudes correspond to second frequencies related to the third signal represented in the frequency domain, and wherein the filter frequency range comprises the second frequencies.

8. The communication device of claim 7, further comprising:

a filter circuit configured to filter the multiplication signal based on the filter frequency range.

9. The communication device of claim 8, wherein the circuit is configured to determine a second interference reference signal, and wherein the circuit is configured to multiply the filtered signal with the second interference reference signal to form a second multiplication signal.

10. The communication device of claim 9, wherein the second interference reference signal is determined based on an inverse of the interference reference signal.

11. The communication device of claim 10, wherein the circuit is a baseband circuit.

12. A method for radio communication, the method comprising:

receiving a signal;

determining an interference reference signal based on an interference signal;

multiplying the received signal with the interference reference signal in the time domain to form a multiplication signal; and filtering the multiplication signal to form a filtered signal.

13. The method of claim 12, wherein the interference reference signal is determined based on an amplitude of the interference signal and a phase of the interference signal.

14. The method of claim 13, wherein the interference reference signal is determined such that the amplitude of the interference reference signal is based on an inverse of the amplitude of the interference signal and the phase of the interference reference signal is based on an inverse of the phase of the interference signal.

15. The method of claim 14, wherein the interference reference signal is determined such that a ratio based on the amplitude of the interference reference signal and the amplitude of the interference signal is constant in time.

16. The method of claim 14, wherein the interference reference signal is determined such that the amplitude of the interference reference signal is proportional to the inverse of the amplitude of the interference signal if the amplitude of the interference signal is greater than a threshold amplitude.

17. The method of claim 16, wherein an interference amplitude value $\alpha$ is proportional to the amplitude of the interference signal based on a factor, and wherein the interference reference signal is determined such that the amplitude of the interference reference signal is proportional to a first amplitude value $$f(a) = \frac{1}{a}$$

if the amplitude of the interference signal is greater than the threshold amplitude.

18. The method of claim 12, wherein the multiplication signal is filtered based on a filter frequency range, wherein the interference reference signal is determined based on the filter frequency range.

19. A device, comprising:

a receiver configured to receive a signal, wherein the device is configured to multiply the received signal with a predetermined interference reference signal in the time domain to form a multiplication signal;

filter the multiplication signal to form a filtered signal.

20. The communication device of claim 1, wherein the second threshold amplitude is half as great as an average amplitude of an estimated interference signal.

* * * * *